(12) United States Patent
Shah et al.

(10) Patent No.: US 8,874,838 B2
(45) Date of Patent: Oct. 28, 2014

(54) PROVIDING DYNAMIC DATABASES FOR A TCAM

(75) Inventors: Sandip Shah, Milpitas, CA (US); Jing Ai, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1339 days.

(21) Appl. No.: 12/647,802

(22) Filed: Dec. 28, 2009

(65) Prior Publication Data

US 2011/0161580 A1 Jun. 30, 2011

(51) Int. Cl.
*G06F 12/00* (2006.01)

(52) U.S. Cl.
USPC ............. 711/108; 711/E12.002; 711/E12.006

(58) Field of Classification Search
None
See application file for complete search history.

(56) References Cited

U.S. PATENT DOCUMENTS

| | | | |
|---|---|---|---|
| 6,289,414 B1 * | 9/2001 | Feldmeier et al. ............. | 711/108 |
| 6,725,326 B1 * | 4/2004 | Patra et al. .................... | 711/108 |
| 7,245,623 B1 * | 7/2007 | Cheriton ........................ | 370/393 |
| 7,263,576 B2 * | 8/2007 | Todd .............................. | 711/108 |
| 7,346,731 B2 * | 3/2008 | Narayanaswamy et al. .. | 711/108 |
| 7,437,528 B1 * | 10/2008 | Moore et al. ................... | 711/170 |
| 2006/0262583 A1 * | 11/2006 | Venkatachary ................. | 365/49 |
| 2007/0245074 A1 * | 10/2007 | Rosenbluth et al. .......... | 711/110 |
| 2008/0209144 A1 * | 8/2008 | Fujimoto ....................... | 711/162 |

OTHER PUBLICATIONS

Technology Tips, "Moving Files vs. Copying Files", Feb. 15, 2008, pp. 1-3, http://web.archive.org/web/20080215192441/http://technologytips.wordpress.com/2007/10/19/moving-files-vs-copying-files/.*

* cited by examiner

*Primary Examiner* — Christopher Birkhimer
(74) *Attorney, Agent, or Firm* — Harrity & Harrity, LLP

(57) ABSTRACT

A network device allocates a particular number of memory blocks in a ternary content-addressable memory (TCAM) of the network device to each database of multiple databases, and creates a list of additional memory blocks in an external TCAM of the network device. The network device also receives, by the external TCAM, a request for an additional memory block to provide one or more rules from one of the multiple databases, and allocates, by the external TCAM and to the requesting database, an additional memory block from the list of additional memory blocks.

20 Claims, 12 Drawing Sheets

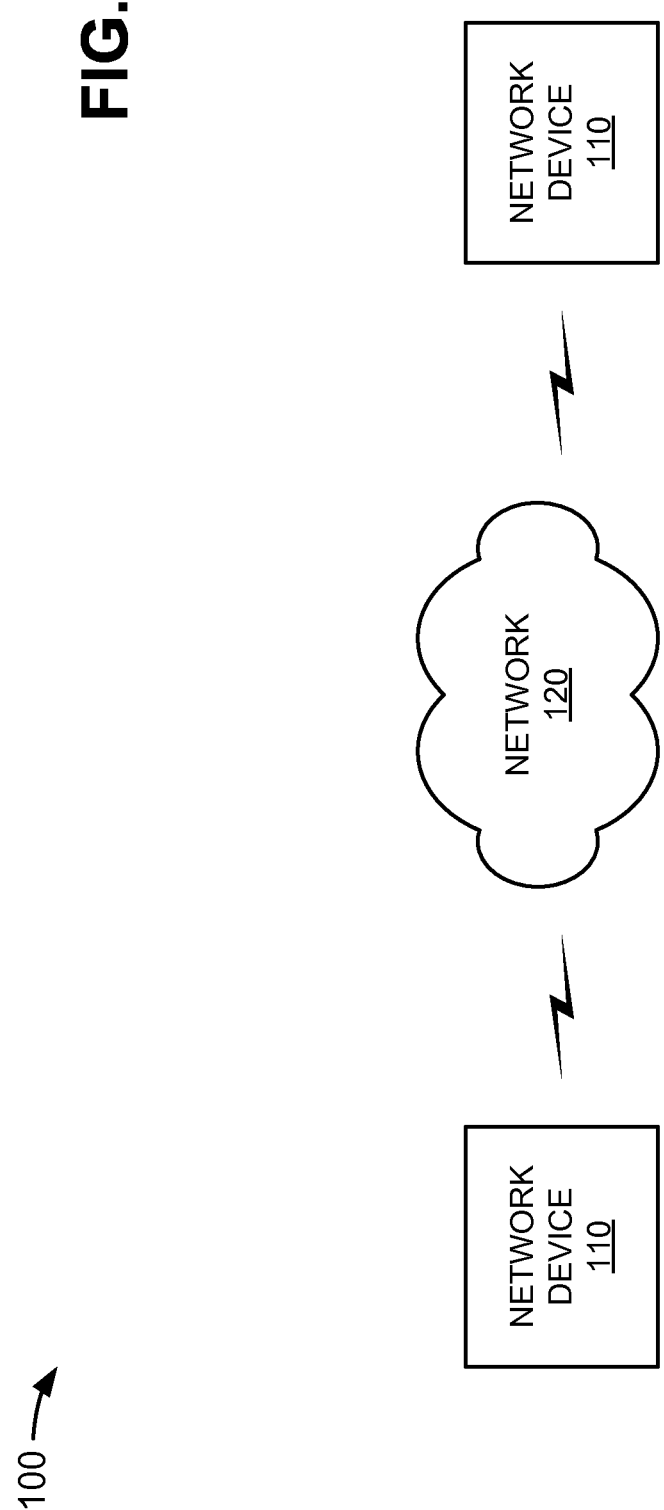

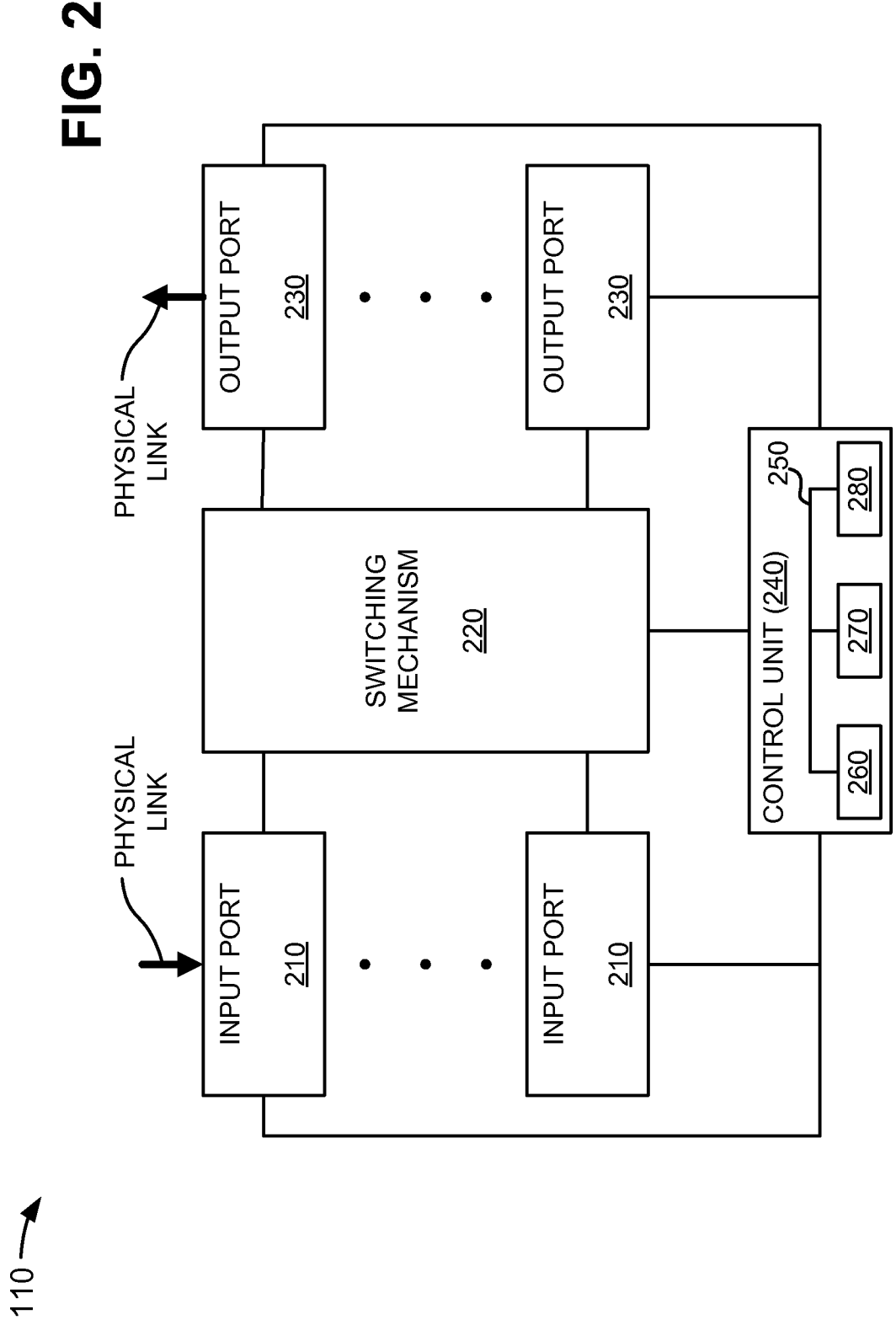

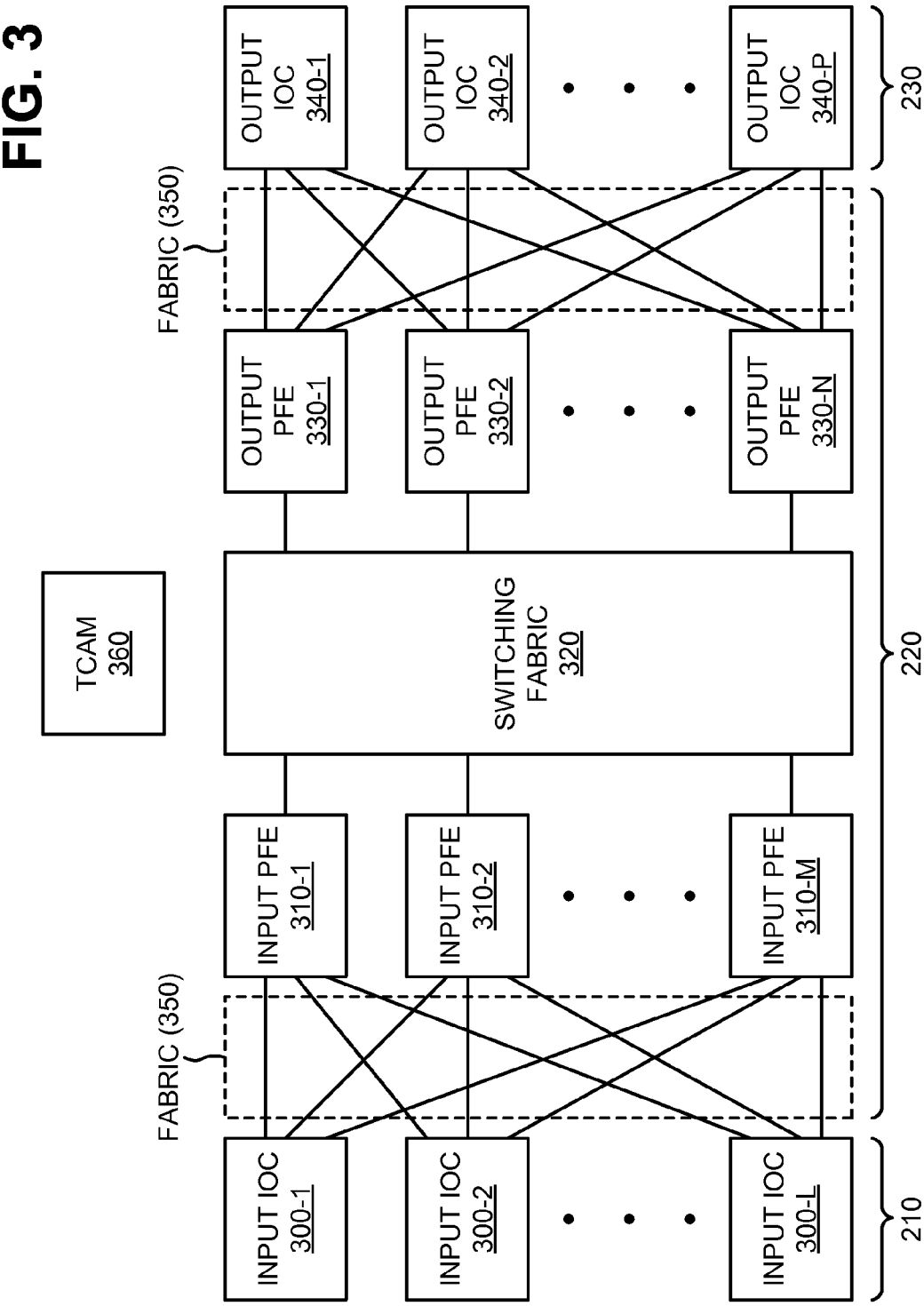

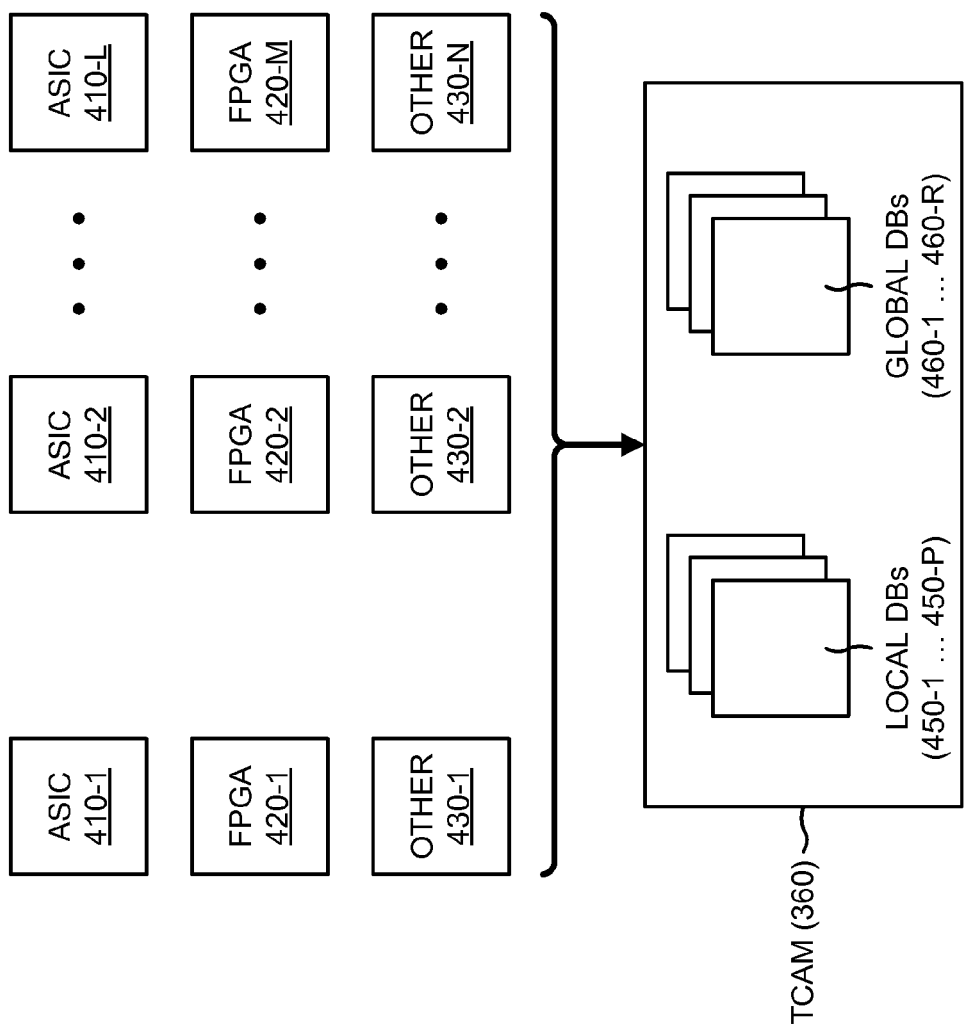

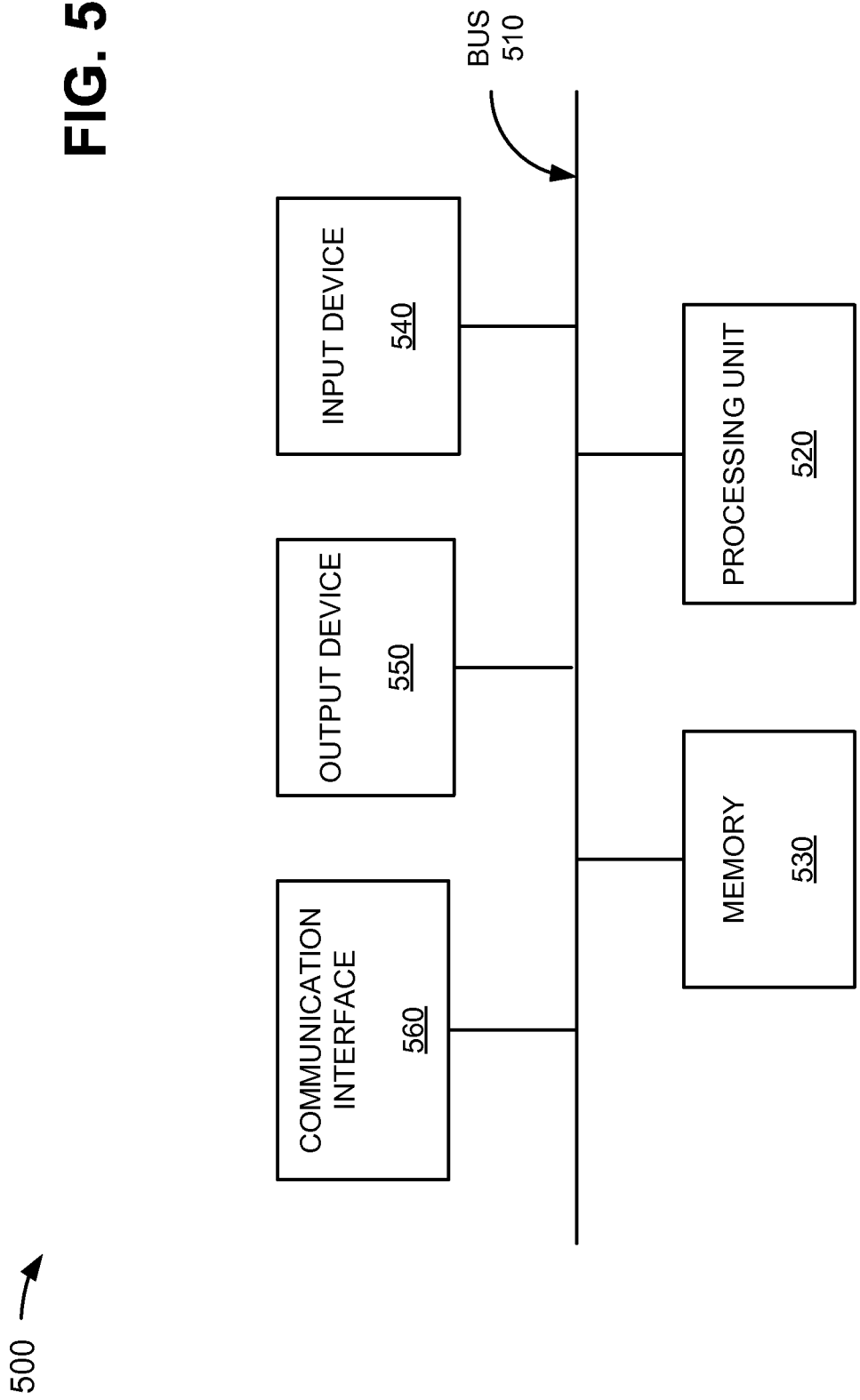

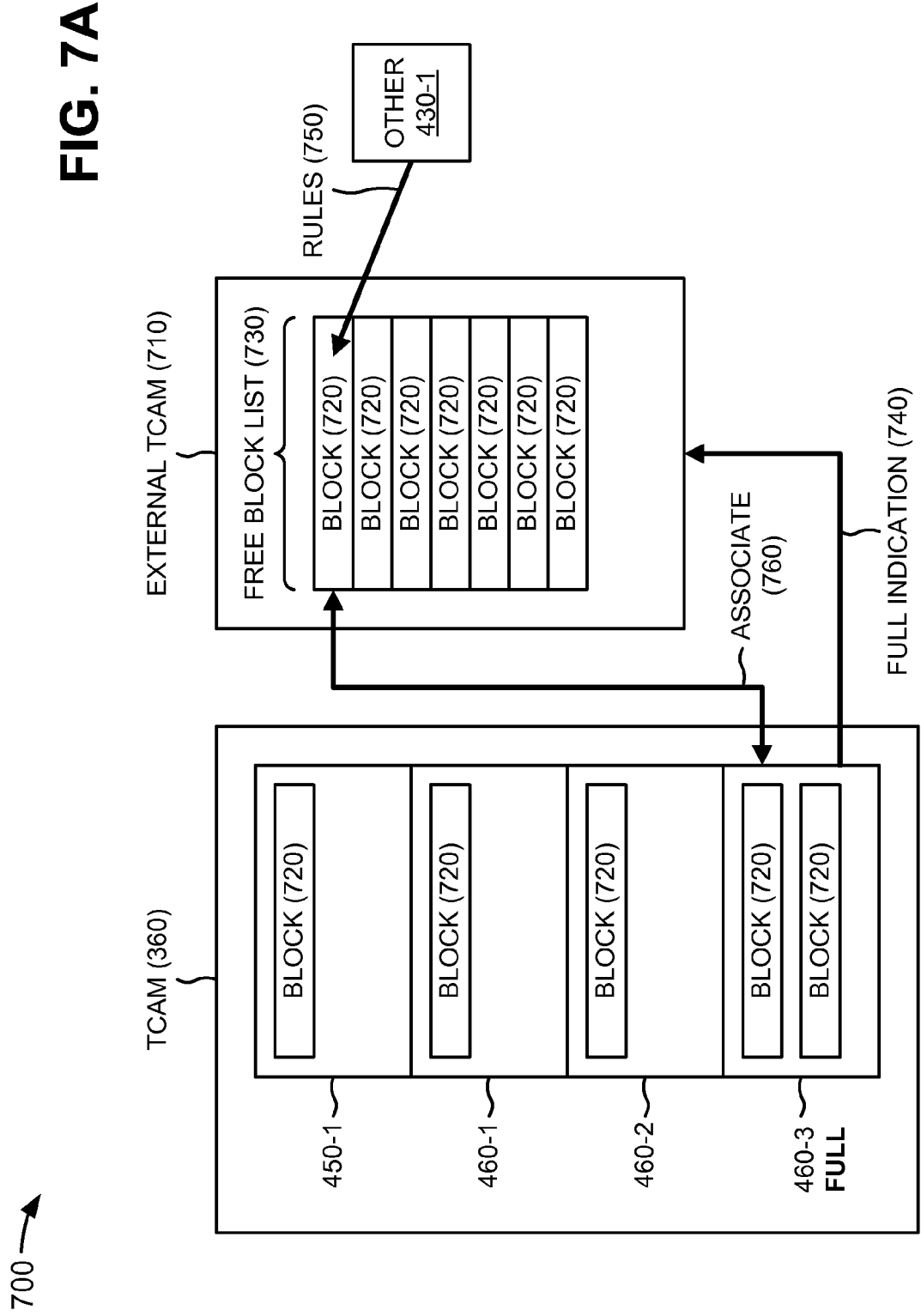

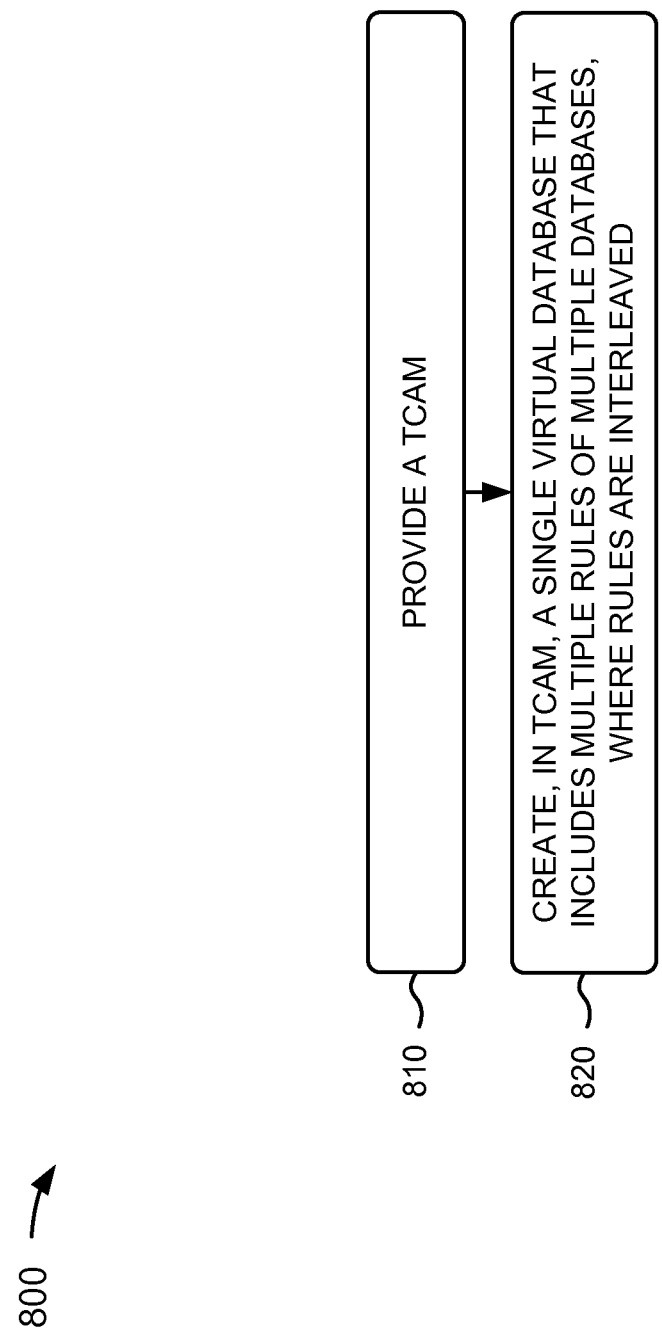

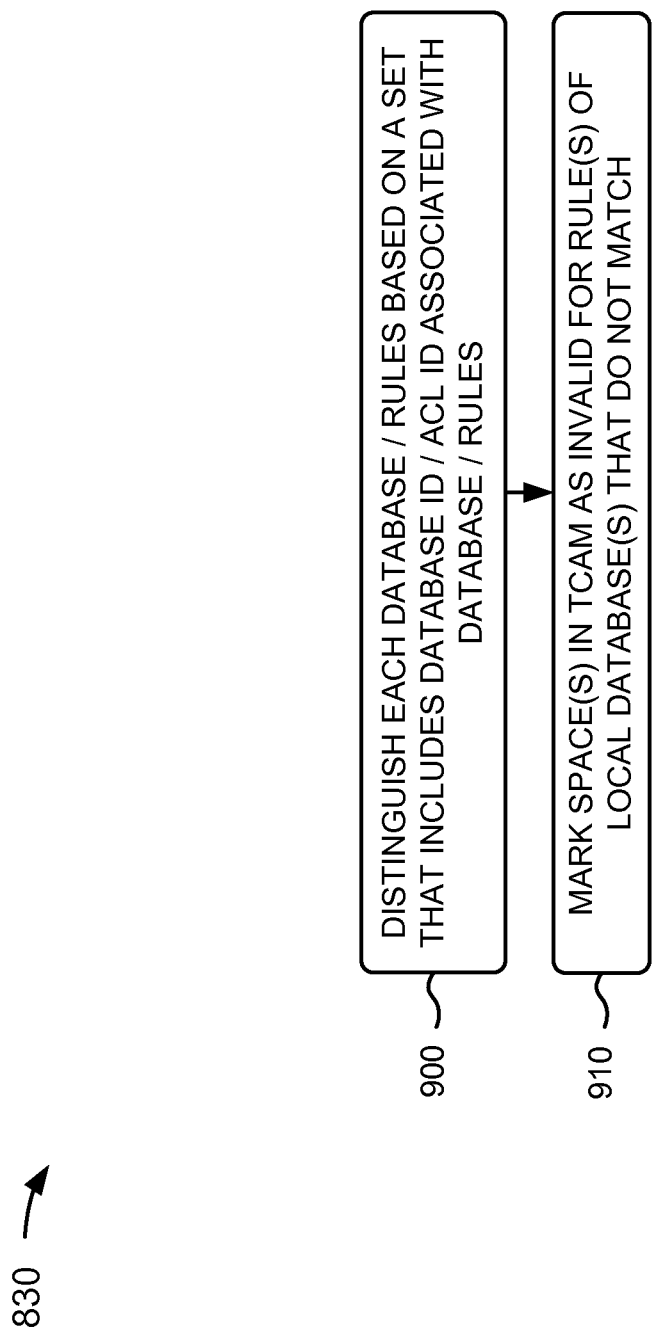

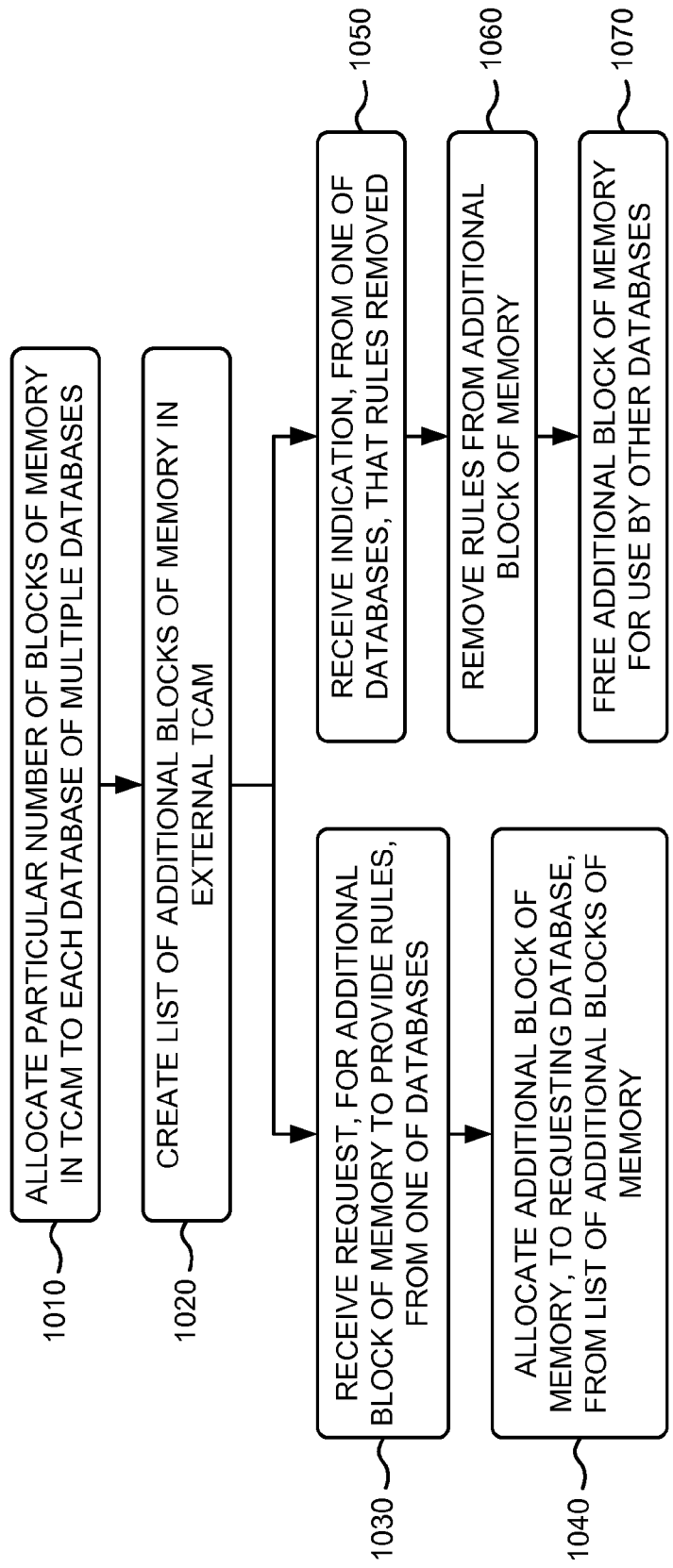

PROVIDING DYNAMIC DATABASES FOR A TCAM

BACKGROUND

Computing and communication networks typically include network devices, such as routers, firewalls, switches or gateways, which transfer or switch data, such as packets, from one or more sources to one or more destinations. Network devices may operate on the packets as the packets traverse the network, such as by forwarding or filtering the packet-based network traffic.

A ternary content-addressable memory (TCAM) is commonly used in network devices and other communication devices for quickly identifying content within a packet. A network device may support a number of different features, such as a network device that functions as both a router and a firewall or a router capable of routing both Internet protocol, version 4 (IPv4) and IPv6 routing prefixes. A single TCAM device may be used to support multiple features. With the increasing number of features requiring TCAM support, such as various security and firewall features, deep packet inspection, routing, and tunnel termination features, sharing of a TCAM space can be a cost effective solution for many designs.

A TCAM may be programmed for various types of access control lists (ACLs) (e.g., port ACLs, virtual local area network (VLAN) ACLs, route ACLs, etc.) for both ingress and egress. An ACL may include a set of rules that are explicitly programmed by a network administrator or implicitly programmed by protocols. Each type of ACL is associated with a lookup which corresponds to a database stored in the TCAM. Each database logically belongs to one or more blocks of memory space in the TCAM. With static allocation of the size of each database in the TCAM (e.g., during initialization), a network device or components of a network device are limited by the database size. For example, some databases may overflow with information while other databases may be empty.

SUMMARY

According to one aspect, a method may be implemented by a network device. The method may include providing, by the network device, a ternary content-addressable memory (TCAM); and creating, by the network device, a single virtual database in the TCAM, where the single virtual database includes rules of a plurality of databases and where the rules are interleaved.

According to another aspect, a method may be implemented by a network device. The method may include allocating, by the network device, a particular number of memory blocks in a ternary content-addressable memory (TCAM) of the network device to each database of multiple databases; creating, by the network device, a list of additional memory blocks in an external TCAM of the network device; receiving, by the external TCAM, a request for an additional memory block to provide one or more rules from one of the databases; and allocating, by the external TCAM and to the requesting database, an additional memory block from the list of additional memory blocks.

According to still another aspect, a network device may include a memory to store a plurality of instructions and a ternary content-addressable memory (TCAM). The network device may also include a processor to execute instructions in the memory to create a single virtual database in the TCAM, where the single virtual database includes rules of a plurality of databases and where the rules are interleaved.

According to a further aspect, a network device may include a memory to store instructions, a ternary content-addressable memory (TCAM) that includes databases with contiguous rules, and a secondary TCAM. The network device may also include a processor to execute instructions in the memory to allocate at least one memory block in the TCAM to each database, create a list of additional memory blocks in the secondary TCAM, receive a request for an additional memory block to provide one or more rules from one of the databases, and allocate, to the requesting database, an additional memory block from the list of additional memory blocks provided in the secondary TCAM.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIG. 1 is a diagram of an exemplary network in which systems and/or methods described herein may be implemented;

FIG. 2 is a diagram of exemplary devices of a network device depicted in FIG. 1;

FIG. 3 is a diagram of further exemplary devices of the network device;

FIG. 4 is a diagram of exemplary components of one of the devices depicted in FIG. 3 and the components' interaction with a ternary content addressable memory (TCAM);

FIG. 5 is a diagram of an exemplary portion of one of the components depicted in FIG. 4;

FIGS. 7A and 7B are diagrams of exemplary interactions among the TCAM depicted in FIGS. 3 and 4 and an external TCAM;

FIGS. 8 and 9 are flow charts of an exemplary process for dynamically changing databases in a TCAM according to implementations described herein; and FIG. 10 is a flow chart of an exemplary process for dynamically changing sizes of databases in a TCAM according to implementations described herein.

DETAILED DESCRIPTION

Figure 6A:
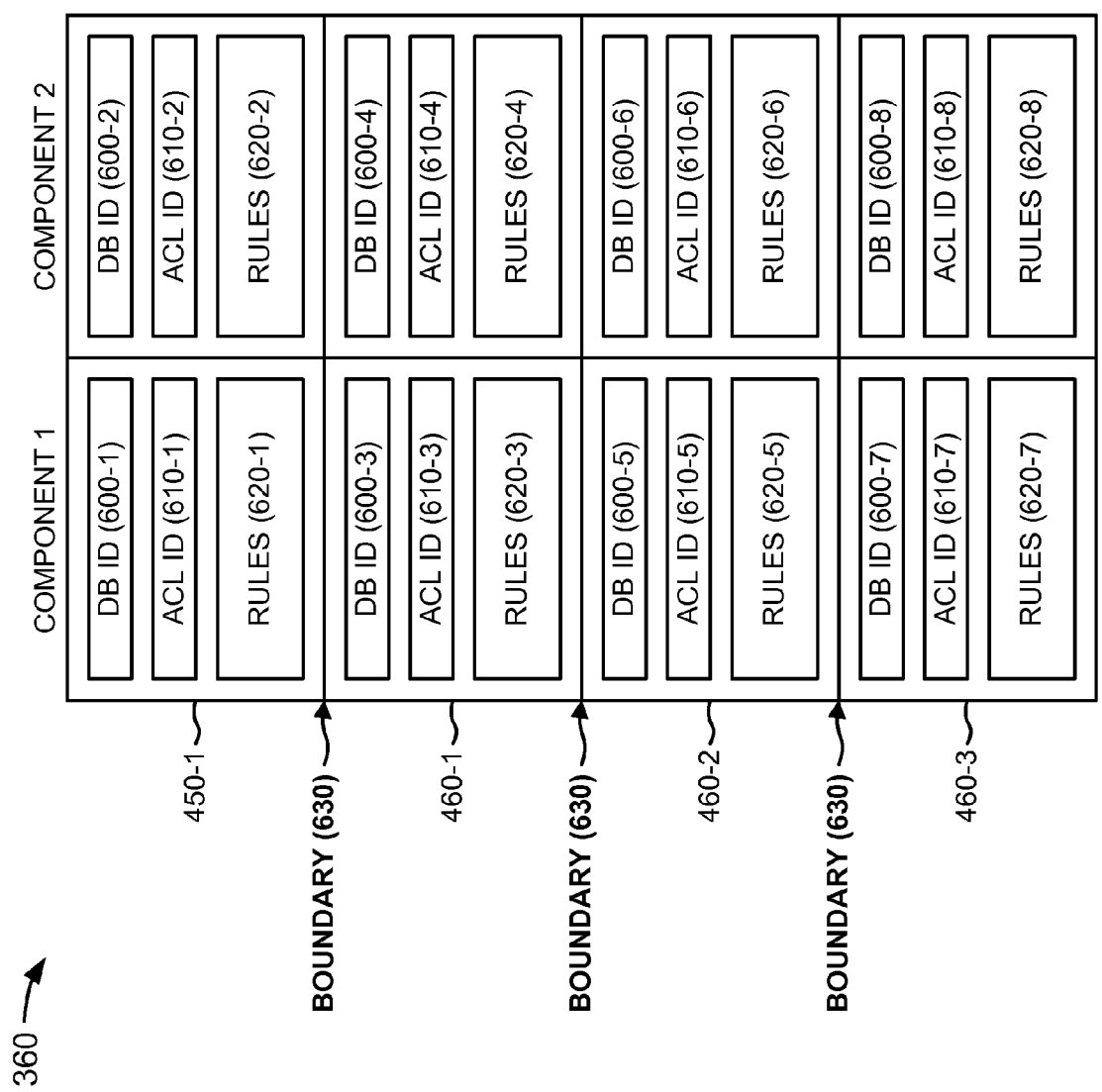
FIG. 6A is a diagram of an exemplary portion of the TCAM depicted in FIGS. 3 and 4, where the TCAM provides a static configuration of databases.

The following detailed description refers to the accompanying drawings. The same reference numbers in different drawings may identify the same or similar elements. Also, the following detailed description does not limit the invention.

Implementations described herein may provide systems and/or methods that dynamically allocate memory space in a TCAM associated with one or more components. The systems and/or methods may change databases, database sizes, and/or keys (e.g., lookup keys) provided within databases associated with the TCAM. For example, multiple size keys may be provided within a single database. In an exemplary implementation, the systems and/or methods may dynamically modify the TCAM to create a single virtual database that includes interleaved rules of all databases associated with the TCAM. In another exemplary implementation, the systems and/or methods may provide additional blocks of memory, external to the TCAM, and may allocate one or more of the additional blocks of memory to a database of the TCAM when the database requires more memory space than allocated in the TCAM for the database. Such implementations may increase utilization of the TCAM and more rules (e.g., ACLs) may be provided in the TCAM.

The terms "component" and "device," as used herein, are intended to be broadly construed to include hardware (e.g., a processor, a microprocessor, an application-specific integrated circuit (ASIC), field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

Exemplary Network

FIG. 1 is a diagram of an exemplary network in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an exemplary implementation, network device 110 may include a device that is capable of transmitting information to and/or receiving information from other network devices 110 via network 120.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows exemplary components of network 100, in other implementations, network 100 may contain fewer components, different components, differently arranged components, or additional components than depicted in FIG. 1.

Exemplary Network Device Configuration

FIG. 2 illustrates a diagram of exemplary devices of network device 110. As shown, network device 110 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In exemplary implementations, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link). Output ports 230 may include scheduling algorithms that support priorities and guarantees. Output ports 230 may support data link layer encapsulation and decapsulation, and/or a variety of higher-level protocols. In an exemplary implementations, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 110. Control unit 240 may handle any packet whose destination address may not be found in the forwarding table.

In an exemplary implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary devices of network device 110, in other implementations, network device 110 may contain fewer devices, different devices, differently arranged devices, or additional devices than depicted in FIG. 2. Alternatively, or additionally, one or more devices of network device 110 may perform one or more other tasks described as being performed by one or more other devices of network device 110.

FIG. 3 is a diagram of further exemplary devices of network device 110. As illustrated, network device 110 may include a group of input IOCs 300-1 through 300-L (collectively referred to as "input IOCs 300" and, in some instances, singularly as "input IOC 300"); a group of input PFEs 310-1 through 310-M (collectively referred to as "input PFEs 310" and, in some instances, singularly as "input PFE 310"); a switching fabric 320, a group of output PFEs 330-1 through 330-N (collectively referred to as "output PFEs 330" and, in some instances, singularly as "output PFE 330"); a group of output IOCs 340-1 through 340-P (collectively referred to as "output IOCs 340" and, in some instances, singularly as "output IOC 340"); fabrics 350; and a TCAM 360. As further shown in FIG. 3, input IOCs 300 may correspond to input ports 210 (FIG. 2); input PFEs 310, output PFEs 330, and fabrics 350 may correspond to switching mechanism 220 (FIG. 2); and output IOCs 340 may correspond to output ports 230 (FIG. 2).

Input IOC 300 may include an input/output card that may be a point of attachment for a physical link and may be a point of entry for incoming packets to network device 110. As shown in FIG. 3, each of input IOCs 300 may interconnect with multiple input PFEs 310 (e.g., point-to-multipoint connections), via fabric 350. Input IOC 300 may include a variety of physical interfaces for receiving packets provided to network device 110. For example, input IOC 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces.

Input PFE 310 may include a component that may process incoming packets (e.g., received from input IOC 300) prior to transmitting the packets to another PFE (e.g., output PFE 330). Input PFE 310 may also perform route lookup for packets, using forwarding tables, to determine destination information. If the destination information indicates that the packets should be sent to another PFE (e.g., output PFE 330) via switching fabric 320, then input PFE 310 may prepare the packets for transmission to the other PFE, if necessary, and may send the packets to the other PFE, via switching fabric 320.

Switching fabric 320 may include a switching component that may allow efficient communication between input PFEs 310 and output PFEs 330. For example, switching fabric 320 may include a hardwired non-blocking minimal spanning switch capable of connecting T inputs to T outputs in any combination.

Output PFE 330 may include a component that may process packets (e.g., received from input PFE 310 via switching fabric 320) prior to transmitting the packets to a network (e.g., network 120). Output PFE 330 may also perform route lookup for packets, using forwarding tables, to determine destination information. If the destination information indicates that the packets should be sent out on a physical interface (e.g., one of output IOCs 340) connected to output PFE 330, then output PFE 330 may prepare the packets for transmission by, for example, adding any necessary headers, and may transmit the packets to one of output IOCs 340.

Fabric 350 may include a switching component that may allow efficient communication between input IOCs 300 and input PFEs 310 and between output PFEs 330 and output IOCs 340. For example, fabric 350 may include a hardwired non-blocking minimal spanning switch capable of connecting S inputs to S outputs in any combination.

TCAM 360 may include a CAM, a TCAM, or some other type of content-addressable memory device. A CAM may include a type of associative computer memory that is designed for high-speed searching applications. Unlike standard random access computer memory in which the memory returns a data word based on a supplied address, a CAM may be designed such that, in response to a data word, the CAM may perform a parallel search of its entire memory to determine if that data word is stored. If the data word is found, the CAM may return a list of the storage addresses where the data word was found.

In an exemplary implementation, the CAM may particularly be a TCAM. A TCAM may include a CAM that allows states in the CAM to be specified as "don't care" states. For example, a TCAM might have an entry such as "10XX0," where "X" may indicate the "don't care" state. This entry may match any of the four search keys: "10000," "10010," "10100," or "10110." TCAM 360 may be implemented for two entries that are written to TCAM 360 for each search item: a first entry corresponding to a pattern that is to be matched; and a second "mask" entry that specifies which fields in the first entry are "don't care" states. The first value may be the pattern and the second value may be the mask entry "11001", where a "0" may indicate that corresponding data in the pattern is to be masked (i.e., it is a "don't care" state).

An address of a highest priority match that corresponds to a particular search key may, after output by TCAM 360, be input to an action lookup table to obtain an action corresponding to the match. The action may include, for example, drop (discard) the corresponding data unit, accept (i.e., pass or do not drop) the data unit, increment a counter, or other actions. The action may then be implemented. The priority for the highest priority match may be defined by, for example, lower address values in TCAM 360 having a higher priority. In other implementations, priority may be defined differently.

In an exemplary implementation, TCAM 360 may include an ACL TCAM that includes multiple databases, and each database may include an ACL. An ACL may include a set of rules that are explicitly programmed by a network administrator or implicitly programmed by protocols. Further details of TCAM 360 are provided below in connection with, for example, FIGS. 4 and 6A-7B.

Although FIG. 3 shows exemplary devices of network device 110, in other implementations, network device 110 may contain fewer devices, different devices, differently arranged devices, or additional devices than depicted in FIG. 3. Alternatively, or additionally, one or more devices of network device 110 may perform one or more other tasks described as being performed by one or more other devices of network device 110.

FIG. 4 is a diagram of exemplary components 400 of one of the devices of network device 110 (e.g., one of input IOCs 300, input PFEs 310, output PFEs 330, output PFEs 340, fabrics 350, etc.) and exemplary components' 400 interaction with TCAM 360. As shown, each device of network device 110 may include one or more components 400, such as one or more ASICs 410-1 through 410-L (collectively referred to as "ASICs 410" and, in some instances, singularly as "ASIC 410"); one or more FPGAs 420-1 through FPGA 420-M (collectively referred to as "FPGAs 420" and, in some instances, singularly as "FPGA 420"); and/or other components 430-1 through 430-N (collectively referred to as "other components 430" and, in some instances, singularly as "other component 430"). Exemplary components 400 may interconnect with each other and/or with TCAM 360 via wired or wireless connections.

ASIC 410 may include an integrated circuit customized for a particular use, rather than intended for a general-purpose use. For example, ASIC 410 may include a chip designed to execute one or more operations of a device (e.g., input IOC 300, input PFE 310, etc.) provided in network device 110. In an exemplary implementation, ASIC 410 may be associated with TCAM 360, with one or more databases stored in TCAM 360, etc.

FPGA 420 may include an integrated circuit designed to be configured by a customer (e.g., "field-programmable"). For example, FPGA 420 may be configured to execute one or more operations of a device (e.g., input IOC 300, input PFE 310, etc.) provided in network device 110. In an exemplary implementation, FPGA 420 may be associated with TCAM 360, with one or more databases stored in TCAM 360, etc.

Other component 430 may include one or more devices that may be associated with TCAM 360. In an exemplary implementation, other component 430 may be associated with one or more databases stored in TCAM 360. An example of other component 430 may include an integrated circuit with programmable logic.

As further shown in FIG. 4, TCAM 360 may include a group of local databases (DBs) 450-1 through 450-P (collectively referred to as "local databases 450" and, in some instances, singularly as "local database 450") and a group of global databases (DBs) 460-1 through 460-R (collectively referred to as "global databases 460" and, in some instances, singularly as "global database 460").

Local database 450 may include a logical entity that may be defined by a set of entries that are searchable during a hardware lookup cycle. In an exemplary implementation, local database 450 may include a database with a unique database identifier (ID) and one or more ACLs (e.g., sets of rules), and whose rules are programmed for a particular component (e.g., one or exemplary components 400).

Global database 460 may include a logical entity that may be defined by a set of entries that are searchable during a hardware lookup cycle. In an exemplary implementation, global database 460 may include a database with a unique database identifier (ID) and one or more ACLs (e.g., sets of rules). Unlike local database 450, global database 460 may include rules that are programmed for every component (e.g., all of exemplary components 400).

Although FIG. 4 shows exemplary components 400 of one of the devices of network device 110, in other implementations, the device of network device 110 may contain fewer components, different components, differently arranged components, or additional components than depicted in FIG. 4. Alternatively, or additionally, one or more components of the device of network device 110 may perform one or more other tasks described as being performed by one or more other components of the device of network device 110.

FIG. 5 is a diagram of an exemplary portion 500 of one of exemplary components 400 (FIG. 4). As shown, exemplary component 400 may include a bus 510, a processing unit 520, a memory 530, an input device 540, an output device 550, and a communication interface 560.

Bus 510 may permit communication among exemplary portion 500 of component 400. Processing unit 520 may include one or more processors or microprocessors that interpret and execute instructions.

Memory 530 may include a RAM or another type of dynamic storage device that stores information and instructions for execution by processing unit 520, a ROM or another type of static storage device that stores static information and instructions for the processing unit 520, and/or some other type of magnetic or optical recording medium and its corresponding drive for storing information and/or instructions.

Input device 540 may include a device that permits information to be input to component 400. Output device 550 may include a device that outputs information from component 400. Communication interface 560 may include any transceiver-like mechanism that enables component 400 to communicate with other components, devices, and/or systems.

As described herein, component 400 may perform certain operations in response to processing unit 520 executing software instructions contained in a computer-readable medium, such as memory 530. The software instructions may be read into memory 530 from another computer-readable medium or from another device via communication interface 560. The software instructions contained in memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Exemplary TCAM Configurations

FIG. 6A is a diagram of an exemplary portion of TCAM 360, where TCAM 360 provides a static configuration of databases. As shown in FIG. 6A, TCAM 360 may include local database 450-1 and global databases 460-1 through 460-3. Local database 450-1 and global databases 460-1 through 460-3 may include features described above in connection with, for example, FIG. 4. As further shown, local database 450-1 and global databases 460-1 through 460-3 may be associated with one of exemplary components 400 (e.g., a first component labeled as "COMPONENT 1") and may be associated with another one of exemplary components 400 (e.g., a second component labeled as "COMPONENT 2").

Local database 450-1 may include a database ID 600-1, an ACL ID 610-1, and rules 620-1. Database ID 600-1 may provide a mechanism to identify local database 450-1 and to separate local database 450-1 from other databases provided in TCAM 360. Database ID 600-1 may be part of a key used to locate information contained in local database 450-1. ACL ID 610-1 may provide a mechanism to identify an ACL (e.g., rules 620-1) provided in local database 450-1 and to separate the ACL from other ACLs provided within and across databases of TCAM 360. ACL ID 610-1 may be part of a key used to locate the ACL provided in local database 450-1. Rules 620-1 may include rules that are particularly programmed for COMPONENT 1. Rules 620-1 may be associated with and located via ACL ID 610-1.

Database ID 600-2, ACL ID 610-2, and rules 620-2 (e.g., of local database 450-1) may include features similar to the features described above for database ID 600-1, ACL ID 610-1, and rules 620-1, respectively. However, database ID 600-2, ACL ID 610-2, and rules 620-2 may be associated with COMPONENT 2.

Global database 460-1 may include a database ID 600-3, an ACL ID 610-3, and rules 620-3. Database ID 600-3 may provide a mechanism to identify global database 460-1 and to separate global database 460-1 from other databases provided in TCAM 360. Database ID 600-3 may be part of a key used to locate information contained in global database 460-1. ACL ID 610-3 may provide a mechanism to identify an ACL (e.g., rules 620-3) provided in global database 460-1 and to separate the ACL from other ACLs provided within and across databases of TCAM 360. ACL ID 610-3 may be part of a key used to locate the ACL provided in global database 460-1. Rules 620-3 may include rules that are programmed for all components (e.g., COMPONENT 1 and COMPONENT 2) associated with TCAM 360. Rules 620-3 may be associated with and located via ACL ID 610-3.

Database ID 600-4, ACL ID 610-4, and rules 620-4 (e.g., of global database 460-1) may include features similar to the features described above for database ID 600-3, ACL ID 610-3, and rules 620-3, respectively. However, database ID 600-4, ACL ID 610-4, and rules 620-4 may be associated with COMPONENT 2. Global databases 460-2 and 460-3 may include features similar to the features described above for global database 460-1.

The arrangement of databases (e.g., of TCAM 360) depicted in FIG. 6A may be referred to as a static allocation (or a static partition). As further shown in FIG. 6A, in the static allocation, local database 450-1 and global databases 460-1 through 460-3 (e.g., and rules 620 provided within these databases) may be contiguous with each other. In other words, boundaries 630 may provided between local database 450-1 and global databases 460-1 through 460-3 (e.g., and rules 620 provided within these databases). Furthermore, in the static allocation, lookups for an ACL ID 610 may span only a particular database (e.g., one of local database 450-1 and global databases 460-1 through 460-3) to which ACL ID 610 is associated.

Figure 6B:
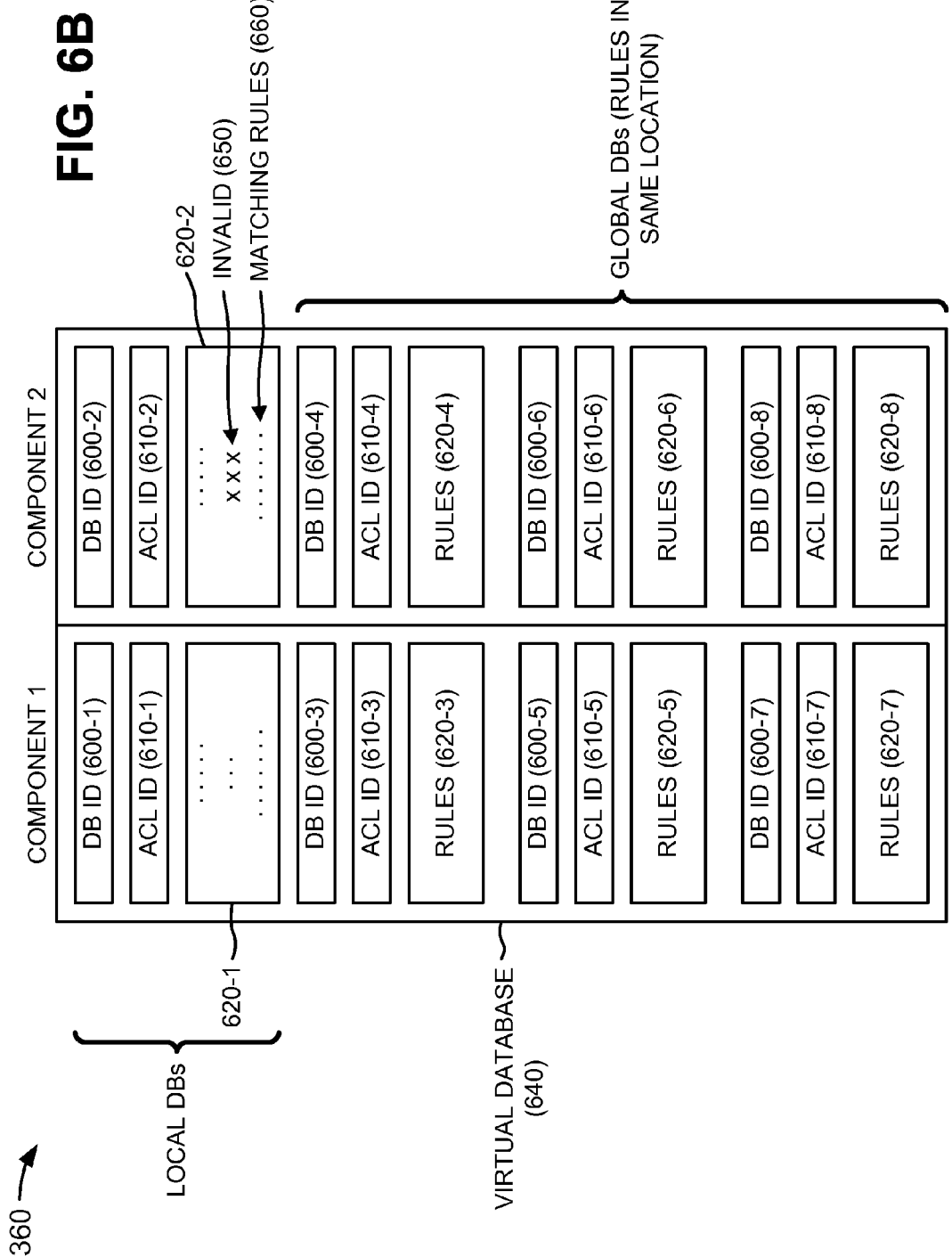
FIG. 6B is a diagram of an exemplary portion of the TCAM depicted in FIGS. 3 and 4, where the TCAM provides a dynamic configuration of databases.

FIG. 6B is a diagram of an exemplary portion of TCAM 360, where TCAM 360 provides a dynamic configuration of databases. In an exemplary implementation, component 400 (e.g., of network device 110) may provide TCAM 360 and may create a single virtual database 640 in TCAM 360. Single virtual database 640 may include databases (e.g., local database 450-1 and global databases 460-1 through 460-3) and rules 620. For example, single virtual database 640 may not include boundaries 630 (e.g., formerly provided between local database 450-1 and global databases 460-1 through 460-3) but may include rules 620 of all of the databases (e.g., rules 620 of local database 450-1 and global databases 460-1 through 460-3). In an exemplary implementation, rules 620 of local database 450-1 and global databases 460-1 through 460-3 may be interleaved (e.g., arranged in or as if in alternate layers), rather than contiguous (e.g., as in FIG. 6A).

A tuple (e.g., set of one or more elements) that includes a database ID (e.g., database ID 600) and an ACL ID (e.g., ACL ID 610) may be used (e.g., by component 400) to distinguish local database 450-1 and global databases 460-1 through 460-3 (e.g., in virtual database 640) and rules 620 provided in these databases. In an exemplary implementation, lookups for ACL IDs 610 may span the entire virtual database 640. The dynamic arrangement (or allocation) of databases depicted in FIG. 6B may enable all of TCAM 360 to be available for virtual database 640, and may provide for better utilization of TCAM 360 than the static allocation arrangement depicted in FIG. 6A.

As further shown in FIG. 6B, if a number of rules 620-2 (e.g., of local database 450-1) programmed for a particular component (e.g., COMPONENT 2) is less than a number of rules 620-1 programmed for another component (e.g., COMPONENT 1), component 400 may mark one or more spaces in TCAM 360 for one or more of rules 620-2 as invalid 650 (e.g., "x x x"). As indicated by reference number 660, rules 620-2 programmed for COMPONENT 2 that match rules 620-1 programmed for COMPONENT 1 may be aligned and may not be marked invalid. Rules 620-3 and 620-4 of global database 460-1 may be provided at a same location of TCAM 360 for COMPONENT 1 and COMPONENT 2; rules 620-5 and 620-6 of global database 460-2 may be provided at a same location of TCAM 360 for COMPONENT 1 and COMPONENT 2; and rules 620-7 and 620-8 of global database 460-3 may be provided at a same location of TCAM 360 for COMPONENT 1 and COMPONENT 2. Since TCAM 360 size does not change, rules 620 of global databases 460-1, 460-2, and 460-3 may be present for all components (e.g., for COMPONENT 1 and COMPONENT 2) or may not be present for any component (e.g., not present for COMPONENT 1 and COMPONENT 2).

Although FIGS. 6A and 6B show exemplary information of TCAM 360, in other implementations, TCAM 360 may contain less information, different information, differently arranged information, or additional information than depicted in FIGS. 6A and 6B.

Figure 7B:
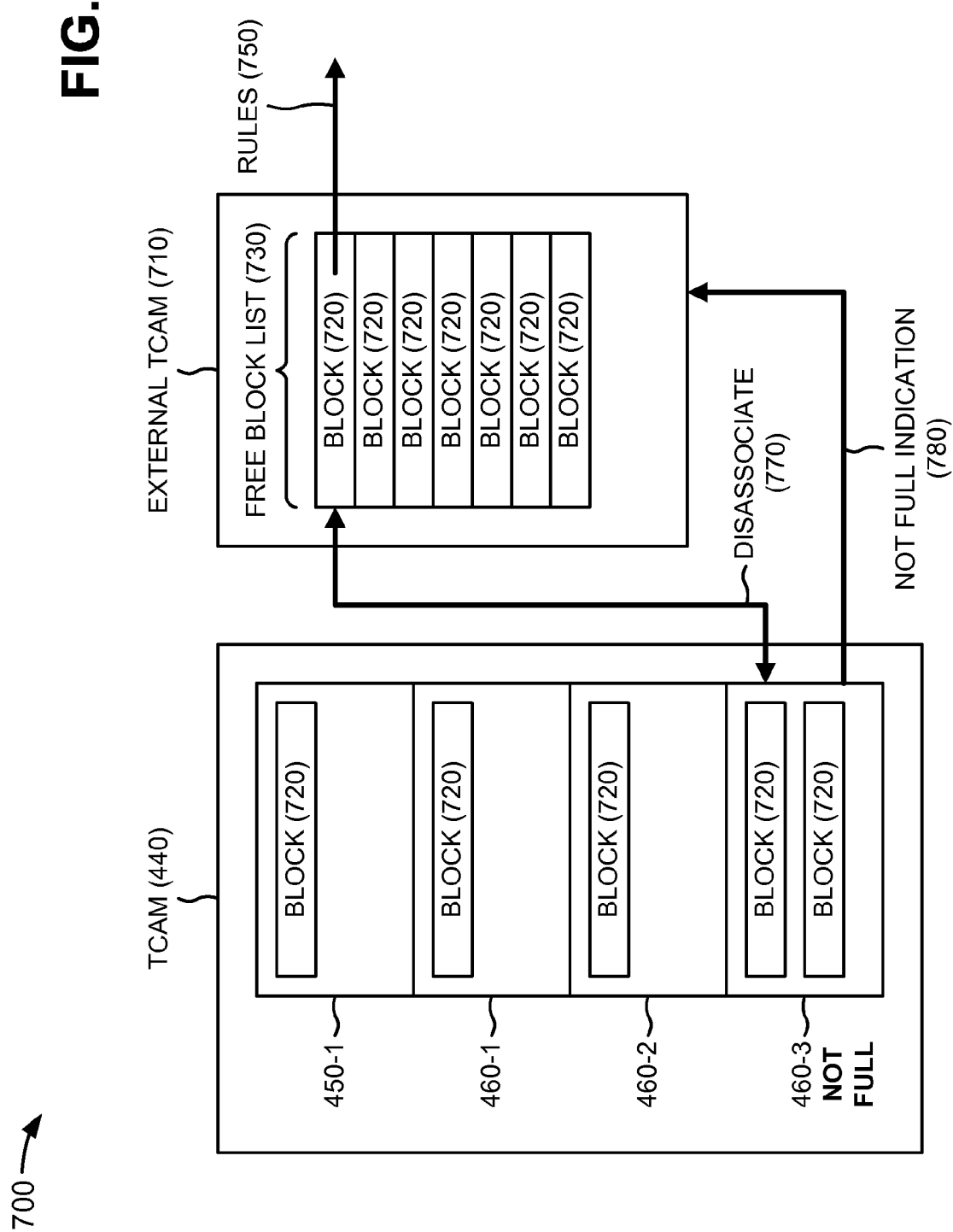

FIGS. 7A and 7B are diagrams of exemplary interactions 700 among TCAM 360 and an external TCAM 710. As shown in FIGS. 7A and 7B, TCAM 360 may include local database 450-1 and global databases 460-1 through 460-3. Local database 450-1 and global databases 460-1 through 460-3 may be associated with other component 430-1. TCAM 360, local database 450-1, global databases 460-1 through 460-3, and other component 430-1 may include the features described above in connection with, for example, FIGS. 3 and 4.

TCAM 360 may include the static allocation discussed above in connection with FIG. 6A. Thus, ACL lookups of TCAM 360 may span only a database (e.g., one of local database 450-1 and global databases 460-1 through 460-3) to which the ACL is associated. Furthermore, sizes of local database 450-1 and global databases 460-1 through 460-3 may be determined during initialization of TCAM 360 and may not change over time. This may cause some databases (e.g., one or more of local database 450-1 and global databases 460-1 through 460-3) to overflow with information while other databases may be empty (or may contain extra space). In such an arrangement, it may be difficult for TCAM 360 to satisfy requirements of various uses (e.g., of network device 110) with different deployment for scenarios.

As further shown in FIG. 7A, local database 450-1 and global databases 460-1 through 460-3 may include blocks 720 of memory (i.e., memory space). During initialization of TCAM 360, a few blocks 720 of memory may be allocated to local database 450-1 and global databases 460-1 through 460-3. One of databases of TCAM 360 (e.g., global database 460-3) may be full of information and local database 450-1 and global databases 460-1 and 460-2 may include extra space. However, in the static allocation of TCAM 360, global database 460-3 may not be able to allocate additional information to local database 450-1 and global databases 460-1 and 460-2.

In such a situation, external TCAM 710 may be provided and may include the features described above in connection with TCAM 360. External TCAM 710 may include a free block list 730 of blocks 720 of memory. As further shown in FIG. 7A, global database 460-3 may provide an indication 740 (e.g., indicating that global database 460-3 is full of information) to external TCAM 710. If other component 430-1 wants to add information (e.g., rules 750) to global database 460-3, external TCAM 710 may allocate one or more blocks 720 of memory in free block list 730 to global database 460-3. Global database 460-3 may be associated with the allocated blocks 720 of memory in free block list 730, as indicated by reference number 760, and other component 430-1 may provide rules 750 in the allocated blocks 720 of memory in free block list 730. Such an arrangement may increase the size of one or more databases of TCAM 360 on an as-needed basis, and may increase the size of the ACL lookup span of TCAM 360.

As shown in FIG. 7B, if rules 750 are removed from the allocated blocks 720 of memory provided in free block list 730, global database 460-3 may be disassociated with the allocated blocks 720 of memory provided in free block list 730, as indicated by reference number 770. Alternatively, or additionally, if global database 460-3 provides an indication 780 (e.g., indicating that global database 460-3 is not full of information) to external TCAM 710, global database 460-3 may be disassociated 770 with the allocated blocks 720 of memory provided in free block list 730, and rules 750 may be provided in global database 460-3. For example, other component 430-1 may load rules 750 in global database 460-3 or rules 750 may be transferred from the allocated blocks 720 of memory (e.g., in free block list 730) to global database 460-3.

The arrangement depicted in FIGS. 7A and 7B may provide for a small static allocation and a dynamic remaining allocation of memory space in TCAM 360, which may increase utilization of TCAM 360. For example, a small static allocation of TCAM 360 memory space during initialization of TCAM 360 may prevent databases of TCAM 360 from not having enough memory space. Dynamic allocation of TCAM 360 memory space (e.g., on a first come, first serve basis) may enable a user to change the size of TCAM 360 to satisfy ACL needs.

Although FIGS. 7A and 7B show exemplary interactions 700 among TCAM 360 and external TCAM 710, in other implementations, TCAM 360 and external TCAM 710 may perform different interactions or additional interactions than depicted in FIGS. 7A and 7B.

Exemplary Processes

FIGS. 8 and 9 are flow charts of an exemplary process 800 for dynamically changing databases in a TCAM according to implementations described herein. In one implementation, process 800 may be performed by one or more components 400 (FIG. 4). In another implementation, some or all of process 800 may be performed by network device 110.

As illustrated in FIG. 8, process 800 may include providing a TCAM (block 810), and creating, in the TCAM, a single virtual database that include multiple rules of multiple databases, where the rule are interleaved (block 820). For example, in implementations described above in connection with FIGS. 6A and 6B, component 400 (e.g., of network device 110) may provide TCAM 360 and may create single virtual database 640 in TCAM 360. Single virtual database 640 may include databases (e.g., local database 450-1 and global databases 460-1 through 460-3) and rules 620. In one example, single virtual database 640 may not include boundaries 630 (e.g., formerly provided between local database 450-1 and global databases 460-1 through 460-3) but may include rules 620 of all of the databases (e.g., rules 620 of local database 450-1 and global databases 460-1 through 460-3). In another example, rules 620 of local database 450-1 and global databases 460-1 through 460-3 may be interleaved (e.g., arranged in or as if in alternate layers), rather than contiguous (e.g., as in FIG. 6A).

Process block 830 may include the process blocks depicted in FIG. 9. As shown in FIG. 9, process block 830 may include distinguishing each database and its associated rules based on a set that includes a database ID and an ACL ID associated with the database and the rules (block 900), and marking one or more spaces in the TCAM as invalid for rule(s) of local database(s) that do not match (block 920). For example, in implementations described above in connection with FIG. 6B, a tuple (e.g., set of one or more elements) that includes a database ID (e.g., database ID 600) and an ACL ID (e.g., ACL ID 610) may be used (e.g., by component 400) to distinguish local database 450-1 and global databases 460-1 through 460-3 (e.g., in virtual database 640) and rules 620 provided in these databases. If a number rules 620-2 (e.g., of local database 450-1) programmed for a particular component (e.g., COMPONENT 2) are less than a number of rules 620-1 programmed for another component (e.g., COMPONENT 1), component 400 may mark one or more spaces in TCAM 360 for one or more of rules 620-1 as invalid 650 (e.g., "x x x").

FIG. 10 is a flow chart of an exemplary process 1000 for dynamically changing sizes of databases in a TCAM according to implementations described herein. In one implementation, process 1000 may be performed by one or more components 400 (FIG. 4). In another implementation, some or all of process 1000 may be performed by network device 110.

As illustrated in FIG. 10, process 1000 may include allocating a particular number of blocks of memory in a TCAM to each database of multiple databases (block 1010), and creating a list of additional blocks of memory in an external TCAM (block 1020). For example, in implementations described above in connection with FIG. 7A, during initialization of TCAM 360, a few blocks 720 of memory may be allocated to local database 450-1 and global databases 460-1 through 460-3. External TCAM 710 may be provided and may include free block list 730 of blocks 720 of memory.

As further shown in FIG. 10, process 1000 may include receiving a request, for an additional block of memory in which to provide one or more rules, from one of the databases (block 1030), and allocating an additional block of memory, to the requesting database, from the list of additional blocks of memory (block 1040). For example, in implementations described above in connection with FIG. 7A, global database 460-3 may provide indication 740 (e.g., indicating that global database 460-3 is full of information) to external TCAM 710. If other component 430-1 wants to add information (e.g., rules 750) to global database 460-3, external TCAM 710 may allocate one or more blocks 720 of memory in free block list 730 to global database 460-3. Global database 460-3 may be associated with the allocated blocks 720 of memory in free block list 730, as indicated by reference number 760, and other component 430-1 may provide rules 750 in the allocated blocks 720 of memory in free block list 730.

Alternatively, or additionally, process 1000 may include receiving an indication, from one of the databases, that one or more rules be removed (block 1050), removing the rules from the additional block of memory (block 1060), and freeing the additional block of memory for use by other databases (block 1070). For example, in implementations described above in connection with FIG. 7B, if rules 750 are removed from the allocated blocks 720 of memory provided in free block list 730, global database 460-3 may be disassociated with the allocated blocks 720 of memory provided in free block list 730, as indicated by reference number 770. If global database 460-3 provides indication 780 (e.g., indicating that global database 460-3 is not full of information) to external TCAM 710, global database 460-3 may be disassociated 770 with the allocated blocks 720 of memory provided in free block list 730, and rules 750 may be provided in global database 460-3.

CONCLUSION

Implementations described herein may provide systems and/or methods that dynamically allocate memory space in a TCAM associated with one or more components. The systems and/or methods may change databases, database sizes, and/or keys provided within databases associated with the TCAM. For example, multiple size keys may be provided within a single database. In an exemplary implementation, the systems and/or methods may dynamically modify the TCAM to create a single virtual database that includes interleaved rules of all databases associated with the TCAM. In another exemplary implementation, the systems and/or methods may provide additional blocks of memory, external to the TCAM, and may allocate one or more of the additional blocks of memory to a database of the TCAM when the database requires more memory space than allocated in the TCAM for the database. Such implementations may increase utilization of the TCAM and more rules (e.g., ACLs) may be provided in the TCAM.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that exemplary aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a network device, the method comprising:
    allocating, by the network device, a particular number of memory blocks in a ternary content-addressable memory (TCAM) of the network device to each database of a plurality of databases of the TCAM;
    creating, by the network device, a list of additional memory blocks in an external TCAM of the network device;
    providing, by a particular database of the plurality of databases of the TCAM and to the external TCAM, an indication that the particular database of the TCAM is full;
    receiving, by the external TCAM, a request to store one or more rules in the particular database of the TCAM; and
    allocating, by the external TCAM, an additional memory block, from the list of additional memory blocks, to store the one or more rules based on the indication and the request.

2. The method of claim 1, further comprising:
    storing, by the external TCAM, the one or more rules in the allocated additional memory block; and
    associating, by the TCAM and the external TCAM, the allocated additional memory block with the particular database of the TCAM.

3. The method of claim 1, further comprising:
    receiving, by the external TCAM and from the particular database, another indication that indicates that the one or more rules are to be removed;
    removing, by the external TCAM and based on the other indication, the one or more rules from the allocated additional memory block; and
    freeing, by the external TCAM and after removing the one or more rules from the allocated additional memory block, the allocated additional memory block for use by any of the plurality of databases.

4. The method of claim 1, further comprising:
    receiving, by the external TCAM and from the particular database, another indication that indicates that the particular database can store the one or more rules;
    removing, by the external TCAM and based on the other indication, the one or more rules from the allocated additional memory block; and
    storing, by the TCAM, the one or more rules in the particular database.

5. The method of claim 1, where the network device comprises one or more of:
    a gateway,
    a router,
    a switch,
    a firewall,
    a network interface card (NIC),
    a hub,
    a bridge,
    a proxy server, or
    an optical add-drop multiplexer (OADM).

6. A network device comprising:
    a memory to:
        store instructions,
        store a ternary content-addressable memory (TCAM) that includes a plurality of databases, and
        store a secondary TCAM; and
    a processor to execute the instructions in the memory to:
        allocate at least one memory block in the TCAM to each database of the plurality of databases,
        create a list of additional memory blocks in the secondary TCAM,
        provide, to the secondary TCAM, an indication that a particular database, of the plurality of databases in the TCAM, is full,
        receive a request to store one or more rules in the particular database of the TCAM, and
        allocate, based on the indication and the request, an additional memory block, from the list of additional memory blocks, provided in the secondary TCAM to store the one or more rules.

7. The network device of claim 6, where the processor is further to execute the instructions in the memory to:
    store the one or more rules in the allocated additional memory block provided in the secondary TCAM, and
    associate the allocated additional memory block, provided in the secondary TCAM, with the particular database of the TCAM.

8. The network device of claim 6, where the processor is further to execute the instructions in the memory to:
    receive another indication that indicates that the one or more rules are to be removed from the allocated additional memory block provided in the secondary TCAM,
    remove, based on the other indication, the one or more rules from the allocated additional memory block provided in the secondary TCAM, and
    free, after removing the one or more rules from the allocated additional memory block, the allocated additional memory block for use by any of the plurality of databases.

9. The network device of claim 6, where the processor is further to execute the instructions in the memory to:
  receive another indication that indicates that the particular database can store the one or more rules,
  remove, based on the other indication, the one or more rules from the allocated additional memory block provided in the secondary TCAM, and
  store the one or more rules in the particular database provided in the TCAM.

10. The network device of claim 6, where the TCAM comprises an access control list (ACL) TCAM associated with one or more components of the network device.

11. A non-transitory computer-readable medium storing instructions, the instructions comprising:
  one or more instructions that, when executed by at least one processor, cause the at least one processor to:
    allocate a particular block of a first ternary content-addressable memory (TCAM) to a particular data structure;
    provide additional blocks of memory in a second TCAM that is external to the first TCAM;
    receive, from the particular data structure, an indication that the particular data structure is full;
    determine that the particular data structure requires more memory space based on the indication; and
    allocate an additional block of memory, of the additional blocks of memory in the second TCAM, to the particular data structure based on determining that the particular data structure requires more memory space.

12. The non-transitory computer-readable medium of claim 11, where the one or more instructions to provide the additional blocks of memory in the second TCAM include:
  one or more instructions that, when executed by the at least one processor, cause the at least one processor to:
    create a list of the additional blocks based on the second TCAM, the list of the additional blocks being for the particular data structure and one or more other data structures that share memory space of the additional blocks with the particular data structure.

13. The non-transitory computer-readable medium of claim 11, where the one or more instructions to determine that the particular data structure requires more memory space include:
  one or more instructions that, when executed by the at least one processor, cause the at least one processor to:
    receive a request to store additional information in the particular data structure, and
    determine, based on the indication and the request, that the particular data structure requires more memory space.

14. The non-transitory computer-readable medium of claim 13, where the additional information includes one or more rules that another component requests to store in the particular data structure.

15. The non-transitory computer-readable medium of claim 11, where the one or more instructions to determine that the particular data structure requires more memory space include:
  one or more instructions that, when executed by the at least one processor, cause the at least one processor to:
    determine that the particular data structure seeks to add additional information to the particular data structure, and
    determine that the particular data structure requires more memory space based on the indication and based on determining that the particular data structure seeks to add the additional information to the particular data structure.

16. The non-transitory computer-readable medium of claim 11, where the instructions further comprise:
  one or more instructions that, when executed by the at least one processor, cause the at least one processor to:
    provide one or more rules in the additional block of memory after the additional block of memory is allocated to the particular data structure.

17. The non-transitory computer-readable medium of claim 11, where the instructions further comprise:
  one or more instructions that, when executed by the at least one processor, cause the at least one processor to:
    receive, from the particular data structure, another indication that information is to be removed from the additional block of memory, and
    free, based on the other indication, the additional block of memory for the additional block of memory to be used by one or more other data structures.

18. A method comprising:
  allocating, by a device, one or more blocks in a first ternary content-addressable memory (TCAM) to a particular data structure;
  providing, by the device, additional blocks of memory in a second TCAM that is external to the first TCAM;
  receiving, by the second TCAM and from the particular data structure of the first TCAM, an indication that indicates that the particular data structure of the first TCAM is full; and
  allocating, by the second TCAM and based on the indication, an additional block of memory, of the additional blocks of memory in the second TCAM, to the particular data structure.

19. The method of claim 18, where allocating the additional block of memory includes:
  receiving a request to provide additional information in the particular data structure, and
  allocating the additional block of memory to the particular data structure based on the indication and the request.

20. The method of claim 18, further comprising:
  receiving, from the particular data structure, another indication that indicates that the particular data structure can store additional information that is being stored in the additional block of memory without using the additional block of memory; and
  disassociating, based on the other indication, the additional block of memory from the particular data structure.

* * * * *